UNITED STATES PATENT OFFICE.

CHRISTIAN RUDOLPH BERGREEN, OF ROITSCH, NEAR BITTERFELD, PRUSSIA, GERMANY.

DEFECATING SACCHARINE LIQUORS.

SPECIFICATION forming part of Letters Patent No. 268,987, dated December 12, 1882.

Application filed April 14, 1882. (No specimens.)

*To all whom it may concern:*

Be it known that I, CHRISTIAN RUDOLPH BERGREEN, manufacturer, residing in Roitsch, near Bitterfeld, Prussia, Germany, have invented certain new and useful Improvements in the Method of Defecation of Saccharine Liquors, whereof the following is a specification.

My invention relates to the defecation of saccharine liquors—*i. e.*, to the purification of the same from foreign substances—whether such liquors be the juice of beet-roots or of sugar-cane, or a solution of raw sugar.

It substantially consists in operating the defecation by means of basic sulphite of magnesium, which is used either alone or previous to any addition to the liquor of caustic lime or other strong bases apt to decompose organic matter; and the object of the invention is to produce in the liquor alkaline sulphites and insoluble magnesic salts and to coagulate albuminous substances while the formation of soluble calcic salts and of caustic alkalies is avoided as much as possible. At the same time the liquor is decolorized to a great extent.

The process may be carried out in different manners. One method of proceeding is as follows: Sulphite or bisulphite of magnesium and caustic magnesia are mixed together in water in such proportions that the compound thereby formed will show basic reaction, and of this compound a sufficient quantity is added to the liquor at a temperature adapted to the quality of the liquor and to the quantity of foreign matter contained therein. The said sulphite or bisulphite of magnesium and caustic magnesia may be such as form articles of commerce. Instead, however, of combining these substances as described, sulphurous acid may be introduced either in liquid or in gaseous state into caustic magnesia, stirred up in water, so much acid being added as is necessary to impart to the solution the required basic character. With this process hyposulphurous acid and trithionic acid may be formed; but this is of no consequence. In case too much acid should have been used, caustic magnesia is subsequently added in the proper quantity.

The second mode of proceeding consists in producing the basic sulphite of magnesium in the saccharine solution by separately adding to the same the requisite quantity of caustic magnesia and sulphurous acid or sulphite or bisulphite of magnesium. Instead of caustic magnesia, a magnesium salt which is decomposed by sulphurous acid may in either case be employed. The defecating medium having been well mixed with the liquor, which at the time of mixing may be warm or cold, the latter is heated or maintained in the heated state until the solid matter has separated out and the liquor has become clear. In case a complete separation should not yet ensue, so much more caustic magnesia is added as is required to produce the desired effect.

It will generally be found advantageous to subject the liquor, after it has been filtered off from the sediment produced, to a subsequent treatment by lime, baryta, or strontia, or by the hydrates or the saccharates or the aluminates thereof, for the purpose of decomposing such of the sulphites formed as are acted upon by the said substances, and of precipitating any magnesia which may have been dissolved.

In case any of the substances named should have been added in excess, such excess may be neutralized wholly or partly by means of carbonic or sulphurous acid, or of both combined, or by the use of any other known and suitable precipitating medium.

From the sediment produced by the defecating process the magnesium sulphite and the caustic magnesia may be recovered by means of known chemical processes. Moreover, the ammonia and other nitrogenous compounds contained in the sediment may be extracted therefrom either in the same process or by a separate treatment.

Having now fully described my said invention and the manner of carrying the same into effect, I would observe, in conclusion, that I am aware of the proposed use of acid sulphite of magnesia for defecating saccharine solutions; but the said acid sulphite is essentially different in its action from the basic sulphite employed by me, and its use forms no part of the present invention.

I claim the new improvements herein described, all and several, to wit:

1. The method of defecating saccharine liquors which consists in adding to or forming in the liquor basic sulphite of magnesium, and, if required, in subsequently adding caustic magnesia, the process being carried out previous to the aforesaid treatment of the liquor by lime or other strong bases, substantially as and for the purpose described.

2. In combination with the method of defecating saccharine liquors by means of basic sulphite of magnesium and caustic magnesia, as described, the subsequent treatment of the liquor by lime, baryta, or strontia, or the hydrates, the saccharates, or the aluminates thereof, substantially as herein specified.

3. In combination with the method of defecating saccharine liquors, as hereinbefore claimed, the employment of carbonic acid or sulphurous acid or of any other known and suitable precipitating medium for the purpose of partly or entirely precipitating any bases added in excess.

In testimony whereof I have signed my name to this specification in the presence of two subscribing witnesses.

CHRISTIAN RUDOLPH BERGREEN.

Witnesses:
HEINRICH SPRINGMANN,
B. ROI.